United States Patent

Horino et al.

[11] Patent Number: 5,750,216
[45] Date of Patent: May 12, 1998

[54] BAG FOR BAG-IN-BOX

[75] Inventors: Morikatsu Horino; Tsuyoshi Kage, both of Tokyo-to; Yutaka Takahashi; Akira Shimomi, both of Kanagawa-ken, all of Japan

[73] Assignees: Kirin Beer Kabushiki Kaisha; Kirin Beverage Corporation; Mitui Petrochemical Industries, Ltd., all of Tokyo-to, Japan

[21] Appl. No.: 537,328

[22] Filed: Oct. 2, 1995

Related U.S. Application Data

[63] Continuation of Ser. No. 105,172, Aug. 12, 1993, abandoned.

[30] Foreign Application Priority Data

Aug. 12, 1992 [JP] Japan .................................. 4-214907

[51] Int. Cl.[6] .................................................. B29D 22/00
[52] U.S. Cl. ..................... 428/34.3; 428/35.2; 428/35.4; 428/35.5; 428/35.7; 428/35.9; 428/36.6; 428/36.7; 222/92; 222/93; 222/96; 220/203; 215/1 C
[58] Field of Search ................... 428/35.2, 35.4, 428/35.3, 35.5, 35.7, 35.8, 35.9, 36.6, 36.7, 34.3; 222/96, 92, 93; 220/203; 215/1 C

[56] References Cited

U.S. PATENT DOCUMENTS

| | | | |
|---|---|---|---|
| 4,704,325 | 11/1987 | Crocker | 428/323 |
| 4,778,699 | 10/1988 | Knox, III et al. | 428/35 |
| 4,851,272 | 7/1989 | Knox, III et al. | 428/35.2 |
| 4,863,770 | 9/1989 | Knox, III et al. | 428/35.7 |
| 4,883,696 | 11/1989 | Iwanami et al. | 428/35.4 |
| 4,971,863 | 11/1990 | Hart | 428/458 |
| 5,035,945 | 7/1991 | Hart | 428/323 |
| 5,145,083 | 9/1992 | Takahashi | 220/206 |
| 5,242,085 | 9/1993 | Richter et al. | 222/105 |

*Primary Examiner*—James J. Seidleck
*Assistant Examiner*—Michael A. Williamson
*Attorney, Agent, or Firm*—Oblon, Spivak, McClelland, Maier & Neustadt, P.C.

[57] ABSTRACT

A bag accommodated in an outer box of a bag-in-box is made of film-like material to be collapsible to push out the contents such as beverage syrups and liquid foods and comprises a bag body and a mouthpiece provided on the bag body for passing the contents therethrough. The bag body is made of polyester resin at a thickness of 20–150 μm.

17 Claims, 2 Drawing Sheets

BAG FOR BAG-IN-BOX

This application is a continuation of application Ser. No. 08/105,172, filed on Aug. 12, 1993, now abandoned.

BACKGROUND OF THE INVENTION

This invention relates to an inner bag accommodated in an outer box of a bag-in-box.

A bag-in-box is a type of package in which a collapsible bag is accommodated in an outer box for protection in order to transport and store liquid. The bag-in-box is often used because it is light in weight, convenient for transportation and relatively inexpensive in comparison with a conventional bottle, can or tank.

However, if a conventional plastic bag, especially polyethylene bag is formed thinner, gas permeability is getting relatively higher (gas barrier property in getting lower) and it causes to deteriorate quality of contents such as liquid due to oxygen. In order to prevent the deterioration, a plastic bag laminated with other films Is generally used. Further, polyethylene has a property of absorbing smell components in environments, so it is known that smell or aroma sticks to contents in the bag. The conventional bag is not strong enough to accommodate liquid including carbon dioxide.

SUMMARY OF THE INVENTION

It is an object to provide a bag for a bag-in-box, which maintain gas barrier property and pressure resistance and can prevent absorption and elution of smell or aroma component, and to enable the bag to use for accommodating beverage syrup or food which a conventional bag cannot accommodate.

According to the invention, there is provided a bag accommodated In an outer box of a bag-in-box, which is made of film-like material so as to be collapsible to push out contents therein such as beverage syrups and liquid foods, comprising a collapsible bag body made of polyester resin at a thickness of 20–150 μm, preferably 50–125 μm, and a mouthpiece provided on the bag body for passing the contents therethrough.

Other objects and advantageous effects of this invention will be explained in detail with respect to the accompanying drawings mentioned below.

DETAILED DESCRIPTION OF THE INVENTION

First, a dispensing system for dispensing cooling beverage such as juice, cola, etc. and a drink such as coffee and tea by using a bag-in-box with a dispenser will now be explained.

Figure 1:
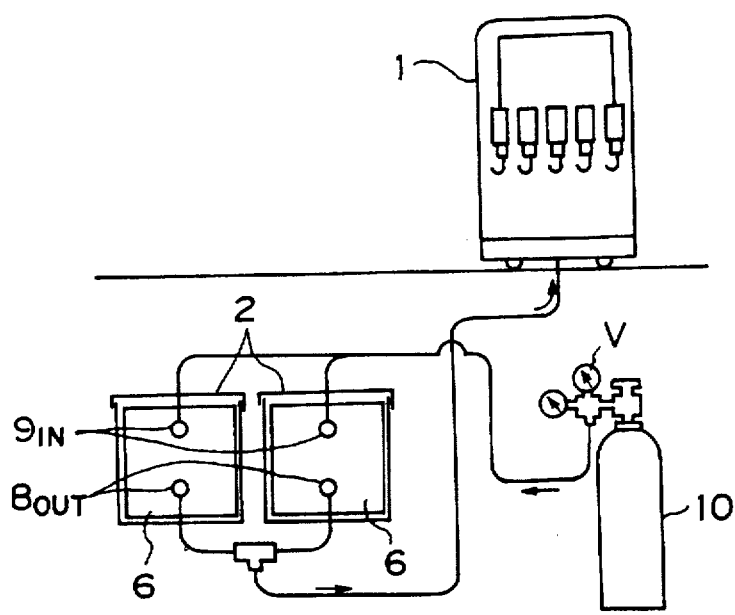
FIG. 1 is a structural view of a dispenser system.
Figure 2:
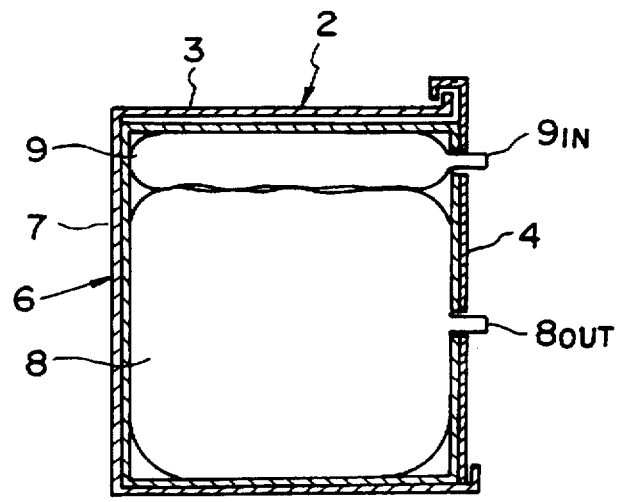
FIG. 2 is a vertically sectional view of the bag-in-box.

In FIGS. 1 and 2, a dispenser 1 is connected to two bag-in-boxes 6 and 6 accommodated in two pressure resistance boxes 2 and 2 and a carbon dioxide tank or cylinder 10 is also connected to the bag-in-boxes 6 in the pressure resistance box 2 through a pressure-reducing valve V.

Figure 3:
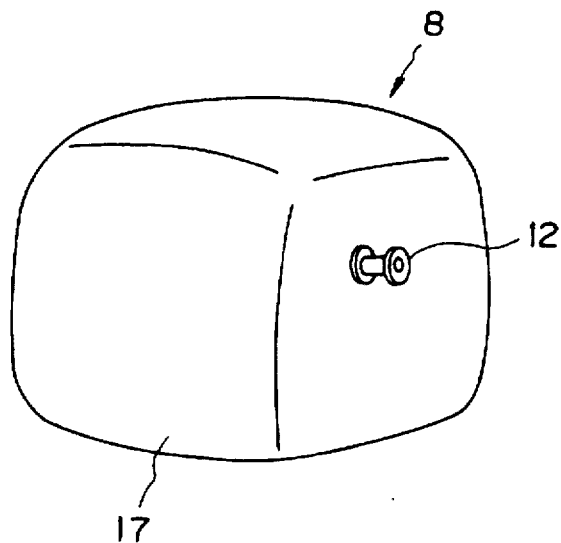
FIG. 3 is a perspective view of an inner bag for a bag-in-box according to this invention.

Each bag-in-box 6 comprises, as shown in FIG. 2, an outer box 7 made of corrugated cardboard, and two upper and lower inner bags 8 and 9 accommodated vertically adjacent to each other in the outer box 7. The lower inner bag B is for accommodating syrup for drinking and the outlet 8 out is connected to the dispenser 1. The inlet 9 IN of the upper inner bag 9 is connected to the carbons dioxide tank 10 as a pressure source. The lower Inner bag 8 has a bag body 17 for containing contents such as cooling beverages and a mouthpiece 12 for pouring out the contents as shown in FIG. 3.

The bag body 17 is made of polyester resin, that is, polyethylene terephthalate resin, polyethylene naphthalate resin and copolymerized polyester resins (1)–(7) mentioned below in detail.

Each resin will now be explained in more detail.

Polyethylene Terephthalate Resin

Polyethylene terephthalate resin (PET) for the bag body 17 according to this invention is made of telephtalic acid or its ester forming derivative and ethylene glycol or its ester forming derivative. The polyethylene terephthalate resin may be copolymerized with other dicarboxylic acid of 20 mol % or less and/or dihydroxy compound less of 20 mol % or less. As dicarboxylic acid used for copolymerization in addition to telephtalic acid, aromatic dicarboxylic acid such as phthalic acid, isophtelic acid, naphthalene dicarboxylic acid, diphenyl dicarboxylic acid and diphenoxyethane dicarboxylic acid; or aliphatic dicarboxylic acid such as adipic acid, sebacic acid, azelaic acid and decanedioic acid; or alicyclic dicarboxylic acid such as cyclohexane dicarboxylic acid may be used.

Further, as dihydroxy compound used for copolymerization in addition to ethylene glycol, aliphatic glycol such as trimethylene glycol, propylen glycol, tetramethylene glycol, neopentyl glycol, hezamethylene glycol and dodecamethylene glycol; or alicyclic glycol such as cyclohexane dimethanol; or bisphenol group; or aromatic diol group such as hydroquinone and 2,2-bix (4-β hydroxyethoxyphenyl) propane.

Such polyethylene telephtalate resin forms substantially linear polyester in such a manner that only ethylene telephtalate component unit itself is ester-bonded or ethylene telephtalate component unit and dioxyethylene terephthalate component unit are disposed at random to be ester-bonded. It is confirmed due to the fact that the polyethylene telephtalate resin dissolves in o-chlorophenol that the polyethylene terephthalate resin is substantially linear.

The limiting (intrinsic) viscosity [η] of polyethylene telephtalate resin (value obtained at 25° C. in o-chlorophenol) is normally 0.6–1.5 dl/g, preferably 0.7–1.2dl/g. The melting point thereof is normally 210°–265° C., preferably 220°–260°C. and the glass transition point thereof is normally 50°–120°C., preferably 60°–100° C.

Polyethylene Naphtalate Resin

Polyethylene naphtalate resin used for the bag body 17 according to this invention includes ethylene-2, 6-naphtalate structural unit, derived from 2,6-naphthalene dicarboxylic acid and ethylene glycol, of 60 mol % or more, preferably 80 mol % or more, more preferably 90 mol % or more. However, the polyethylene naphtalate resin may include a structural unit less than 40 mol % other than ethylene-2,6-naphtalate.

As structural unit other than ethylµm-2, 6-naphtalate, structural units derived from the following components (A group +B group) may be selected.

A group: aromatic dicarboxylic acid such an terephthalic acid, isophtalic acid, 2, 7-naphthalene dicarboxylic acid, 1,7-naphthalene dicarbozylic acid, diphenyl-4, 4'-dicarboxylic acid, 4,4'-diphenylether dicarbozylic acid, 4,4'-diphenylsulfone dicarbozylic acid, 4,4'-diphenoxyethane dicarbozylic acid and dibrometerephthalic acid; aliphatic dicarboxy acid such as adipic acid, azelaic acid, sebacic acid and decanedioic acid; alicyclic dicarboxylic acid such as 1,4-cyclohexane dicarboxylic acid, cyclopropane dicarboxylic acid, hexahydro terephthalic acid; and hydroxy carboxylic acid such as glycolic acid, p-hydroxy benzoic acid, p-hydroxy ethoxy benzoic acid.

B group: propylene glycol, trimethylane glycol (1,3-propanediol), diethylene glycol, tetramethylene glycol, pentamethylene glycol, hexamethylene glycol, decamethylene glycol, neopentylene glycol, p-xylene glycol, 1,4-cyclohexane dimethanol, bisphenol A, p,p-diphenoxysulfone, 1,4-bis (β-hydroxyethoxy) benzene, 2,2-bis (p-β-hydroxy ethoxyphenol) propane, polyalkylene glycol, p-phenylene bisdimethyl siloxane and glycerol.

Further, the polyethylene naphtalate resin used in this invention may include a little structural unit of, e.g., 2 mol % or less, derived from polyfunctional compound such as trimethylol ethane, trimethylol propane and trimethylol methane. The polyethylene naphtalate rosin used In this invention may include a little structural unit of, e.g., 2 mol % or less, derived from single functionality compound such as benzoylbenzoic acid, diphenylsulfone monocarboxylic acid, stearic acid, methoxypolyethylene glycol and phenoxy polyethylene glycol. Such polyethylene naphtalate resin is substantially linear. This is confirmed due to the fact that the polyethylene naphtalate resin dissoves in o-chlorophenol. The limiting viscosity [η] of polyethylene naphtalate resin at a temperature of 25° C. in o-chlorophenol is 0.2–1.1 dl/g, preferably 0.3–0.9 dl/g, more preferably 0.4–0.8 dl/g.

The limiting viscosity [η] of the polyethylene naphtalate resin is measured by the following method. That is, the polyethylene naphthalate resin is dissolved at a density of 1 g/100 ml, and viscosity of the solution is then measured by Ubbelohde type capillary viscometer. Thereafter, o-chlorophenol is gradually added to the solution to measure the viscosity of solution on the side of a low density. Finally, the limiting viscosity [η] is obtained through extrapolation.

The temperature (Tc) of crystallization of polyethylene naphthalate resin at the time of raising the temperature thereof at a rate of 10° C./minute by a differential scanning calorimeter (DSC) is normally 150° C. or more, preferably 160°–230° C., more preferably 170°–220° C. The temperature (Tc) thereof is measured by the following method. That is, the polyethylene naphtalate resin is dried for approximately more than 5 hours at a temperature of approximately 140° C. under a pressure of approximately 5 mmHg to prepare a thin piece of 10 mmg as a sample by cutting the dried resin. The sample is put into an aluminum pan for liquid in an atmosphere of nitrogen to measure the temperature of crystallization thereof by means of a DSC-2 type differential scanning calorimeter manufactured by PERKIN ELMER CO.. The measuring conditions are as follows. First, the temperature of the sample is raised rapidly to 290° C. from a room temperature and is maintained at a temperature of 290° C. for 10 minutes to melt the sample. Thereafter, the sample is rapidly cooled down to a room temperature. Then, the temperature of the sample is increased at a rate of 10° C./minute. Under this condition, a temperature at the time when heat generation becomes the maximum value in measured. The temperature at that time is the temperature of crystallization at time of raising temperature.

Copolymarized Polyester Resin (1)

The copolymerized polyester resin (1) for the bag body 17 according to this invention comprises dicarboxylic acid structural unit including terephthalic acid component unit and isophtalic acid component unit; and dihydroxy compound structural unit including ethylene glycol component unit.

The terephthalic acid component unit is included therein by 85–99.5 mol %, preferably 90–99.5 mol % and the isophtalia acid component unit is included therein by 0.5–15 mol %, preferably 0.5–10 mol %. The copolymerized polyester resin may include other dicarboxylic acid of 1 mol % or less within a range of quantity at which the copolymerized polyester resin does not lose its property in addition to the terephthalic acid and the isophtalic acid mentioned above as a component of the dicarboxylic acid. Such dicarboxylic acid is, for example, phthalic acid, 2-methylterephthalic acid or 2,6-naphtalene dicarboxylic acid. Further, the copolymerized polyester resin (1) according to this invention may include other dihydroxy compound of 1 mol % or less within a range of quantity at which the copolymerized polyester resin does not lose its property in addition to the ethylene glycol mèntioned above. Such dihydoxy compound is, for example, 1,3-propanediol, 1,4-butanediol, neopenthyl glycol, cyclohexanediol, cyclohexanedimethanol, 1,3-bis (2-hydroxyethoxy) benzene, 2,2-bis (4-β-hydroxyethoxyphenyl) propane or bis (4β-hydroxyethoxyphenyl) sulfone. Each compound includes carbon atoms of 3 to 15.

Copolymerized Polyester Resin (2)

The copolymerized polyester resin (2) for the bag body 17 according to this invention comprises dicarboxylic acid structural unit including terephthalic acid component unit and 2,6-naphtalene dicarboxylic acid component unit; and dihydroxy compound structural unit including ethylene glycol component.

The terephthalic acid component unit is included therein by 80–99.5 mol%, preferably 90–99.5 mol % and 2,6-naphtalene dicarboxylic acid component unit is included therein by 0.5–20 mol %, preferably 0.5–10 mol %. The copolymerized polyester resin (2) may include other dicarbozylic acid of 1 mol % or less within a range of quantity at which the copolymerized polyester resin does not lose its property in addition to the terephthalic acid and the 2,6-naphtalene dicarboxylic acid mentioned above as a component of dicarboxylic acid. Such dicarboxylic acid is, for example, isophtalic acid, phthalic acid or 2-methylterephthalic acid. Further, the copolymerized polyester resin (2) according to this invention may include other dihydroxy compound of I mol % or less within a range of quantity at which the copolymerized polyester resin does not lose its property in addition to the ethylene glycol mentioned above. Such dihydoxy compound is, for example, 1,3-propane diol, 1,4-butamediol, neopenthyl glycol, cyclohexanediol, cyclohexanedimethanol, 1,3-bis (2-hydroxyethoxy) benzene, 1,4-bis (2-hydroxyethoxy) benzene, 2,2-bis (4-β-hydroxyphenyl) propane or bis (4-β-hydroyethoxyphenyl) sulfone. Each compound includes carbon atoms of 3 to 15.

Copolymerized Polyester Resin (3)

The copolymerized polyester resin (3) for the bag body 17 according to thin invention comprises dicarboxylic acid structural unit including terephthalic acid component unit and adipic acid component unit; an dihydroxy compound structural unit including ethylene glycol component unit.

The terephthalic acid component unit is included therein by 85–99.5 mol %, preferably 90–99.5 mol % and adipic acid component unit included therein by 0.5–15 mol %, preferably 0.5–10 mol %. The copolymerized polyester resin (3) may include or dicarbozylic acid of 1 mol % or less within a range of quantity at which the copolymerized polyester resin (3) does not lose its property in addition to the terephthalic acid and the adipic acid mentioned above as a component of dicarbozylic acid. Such dicarboxylic acid is, for example, isophtalic acid, phthalic acid, 2-methylterephthalic acid or 2,6-naphtalene dicarboxylic acid. Further, the copolymerized polyester resin (3) according to this Invention may include other dihydroxy compound of 1 mol % or less with a range of quantity at which the copolymerized polyester resin (3) does not lose its property in addition to the ethylene glycol mentioned above. Such dihydoxy compound is, for example, 1,3-propanediol, 1,4-butanediol, neopenthyl glycol, cyclohexanediol, cyclohexanedimethanol, 1,3-bis (2-hydroxyethoxy) benzene, 1,4-bis (2-hydroxyethoxy) benzene, 2,2-bis (4-β-hydroxyethoxyphenyl) propane or big (4-β-hydroxyethoxyphenyl) sulfone. Each compound includes carbon atoms of 3 to 15.

Copolymerized Polyester Resin (4)

The copolymerized polyester resin (4) for the main body 17 according to this invention comprises dicarboxylic acid structural unit including terephthalic acid component unit,, and dihydroxy compound structural unit including ethylene glycol component unit and diethylene glycol component unit.

The ethylene glycol component unit is included therein by 93–98 mol %, preferably 95–98 mol % and the diethylene glycol component unit is included therein by 2–7 mol %, preferably 2–5 mol %. The copolymerized polyester resin (4) may include other dicarboxylic acid of 1 mol % or less within a range of quantity at which the copolymerized polyester resin (4) does not lose its property in addition to the terephthalic acid mentioned above as a component of dicarboxylic acid. Such dicarboxylic acid is, for example, isophtalic acid, phthalic acid, 2-methylterephthalic acid or 2,6-naphtalene dicarboxylic acid. Further, the copolymerized polyester resin (4) according to this invention may include other dihydroxy compound of 1 mol % or less within a range of quantity at which the copolymerized polyester resin (4) does not lose its property in addition to the diethylene glycol and the diethylene glycol mentioned above. Such dihydroxy compound is, for example, 1,3-propanediol, 1,4-butanediol, neopenthylglycol, cyclohexanediol, cyclohexanedimethanol, 1,3 bis (2-hydroxyethoxy) benzene, or bis (2-hydroxyethoxy) benzene, or bis (4-β-hydroxyethoxyphenyl) propane, or bis (4-β-hydroxyethoxyphenyl) sulfone. Each compound includes carbon atoms of 3 to 15.

Copolymerized Polyester Resin (5)

The polymerized polyester resin (5) for the bag body 17 according to this invention comprises dicarboxylic acid structural unit including terephthalic acid component unit and isophtalic acid component unit; and dihydroxy compound structural unit including ethylene glycol component unit and neopentyl glycol component unit.

The ethylene glycol component unit is included by 85–99.5 mol % preferably 90–99.5 mol % and the neopentyl glycol of 0.5–15 mol %, preferably 0.5–10 mol %. The copoly-merized polyester resin (5) may include other dicarboxylic acid of 1 mol % or less within a range of quantity at which the copolymerized polyester resin (5) does not less its property in addition to the terephthalic acid and the isophtalic acid mentioned above as a component of dicarboxylic acid. Such dicarboxylic acid is, for example, isophtalic acid, phtalic acid 2-methylterephthalic acid or 2,6-naphtalene dicarboxylic acid. Further, the copolymerized polyester resin (5) according to this invention may include other dihydroxy compound of 1 mol % or less within a range of quantity at which the copolymerized polyester resin (5) does not lose its property in addition to the ethylene glycol and neopentyl glycol mentioned above. Such dihydoxy compound is, for example, 1,3-propanediol, 1,4-butanediol,cyclohexanediol, cyclohexanedimethanol, 1,3-bis (2-hydroxyethoxyphenyl) benzene, 1,4-bis(2-hydroxyethoxy) benzene, 2,2-bin (4-β-hydroxyphenyl) propane or bis (4-β-hydroxyethoxyphenyl) sulfone. Each compound includes carbon atoms of 3 to 15.

Copolymerized Polyester Resin (6)

The copolymerized polyester resin (6) for the bag body 17 according to this invention comprises dicarboxylic acid structural unit including terephthalic acid component unit; and dihydroxycompound structural unit including ethylene glycol component unit and cyclohexane dimethanol component unit.

The ethylene glycol component unit is included therein by 85–99.5 mol %, preferably 90–99.5 mol % and the cyclohexane dimethanol component is included therein by 0.5–15 mol %, preferably 0.5–10 mol %. The copolymerized polyester resin (6) may includes other dicarboxylic acid of 1 mol % or less within a range of quantity at which the copolymerized polyester resin (6) does not lose its property in addition to the terephthalic acid and the isophtalic acid mentioned above as a component of discarboxylic acid. Such discarboxylic acid is, for example, isophtalic acid, phtalic acid, 2-methylterephthalic acid or 2,6-naphtalone dicarboxylic acid. Further, the copolymerized polyester resin (6) according to this invention may include other dihydroxy compound of 1 mol % or less within a range of quantity at which the copolymerized polyester resin (6) does not lose its property in addition to the ethylene glycol and the cyclohexane dimethanol mentioned above. Such dihydoxy compound is, for example, 1,3-propanediol, 1,4-butanediol, cyclohexanediol, cyclohexanedimethanol, 1,3-bis (2-hydroxyethoxy) benzene, 1,4-bis (2-hydroxyethoxy) benzene, 2,2-bis (4-β-hydroxyethoxyphenyl) propane or bin (4-hydroxyethoxyphenyl) sulfone. Each compound includes carbon atoms of 3 to 15.

Copolymerized Polyester Resin (7)

The copolymerized polyester resin (7) for the bag body 17 according to this invention comprises dicarboxylic acid structural unit dihydroxy compound structural unit and polyhydroxy compound structural unit including at least three hydroxy groups. The copolymerized polyester resin (7) comprises dicarboxylic acid structural unit includes isophtalic acid component unit of 20–100 mol %, preferably 50–98 mol % and telephtalic acid component acid of 0–80 mol %, preferably 0.5–50 mol %. The dihydroxy compound structural unit may include dihydroxyethoxy resole component unit of 5–90%, preferably 10 85 mol %, or ethylene glycol component unit of 10–95 mol %, preferably 15–90 mol %.

The copolymerized polyester resin (7) may include polyhydric compound structural unit of 0.05–1.0 parts by mol, preferably 0.1–0.5 parts by mol with respect to dicarboxylic acid component unit of 100 parts by mol. Such polyhydric compound structural unit is derived from the compound of trimethylol methane, trimethylol ethane, and trimethylol propane. Among these components, trimethylol propane is preferable. The copolymerized polyester resin (7) may include other dicarboxylic acid of 1 mol % or less within a range of quantity at which the copolymerized polyester resin does not less its property in addition to the terephthalic acid and the isophtalic acid mentioned above as a component of discarboxylic acid. Such dicarboxylic acid in, for example, isophtalic acid, phtalic acid, 2-methylterephthalic acid or 2,6-naphtalene dicarboxylic acid. Further, the copolymerized polyester resin (7) according to this invention may include other dihydroxy compound of 1 mol % or lose within a range of quantity at which the copolymerized polyester resin (7) does not lose its property in addition to polyester resin, does not lose its property in addition to the dihydroxyethoxy resole and the ethylene glycol mentioned above. Such dihydoxy compound is, for example, 1,3-propanediol, 1,4-butanediol, neopenthyl glycol, cyclohexanediol, cyclohexanedimethanol, 1,3-bis (2-hydroxyethoxy) benzene, 1,4-bis(2-hydroxyethoxy) benzene, 2,2-bis (4-β-hydroxyethoxyphenyl) propane or bis (4-β-hydroxyethoxyphenyl) sulfone. Each compound includes carbon atoms of 3 to 15.

The molecular weight of the above copolymerized polyester resins (1)-(7) is not specially restricted if it is within a range in which various articles, that is, bags can be made of polyester resin composite, and, however, it is preferably that the limiting viscosity [η] of copolymerized polyester resin in o-chlorophenol solvent is within 0.5 dl /g - 1.5 dl/g, preferably 0.6 dl/g–1.2dl/g.

The bag body 17 according to this invention is made of one kind of resin selected from the above various polyester resin. However, the bag body 17 may be made of laminated films of more than two kinds of polyester resin. In this case, polyamide resin may be used as an intermediate layer disposed between laminated layers. The above resins may include various additives such as thermal stabilizer, weather resistant stabilizer, antistatic agent, lubricant, inorganic filler, mould releasing agent, pigment dispersing agent, pigment or dye.

The thickness of the bag body 17 made of the above materials is within 20–150 μm, preferably 50–126 μm. If the thickness is above 150 μm, the bag cannot be smoothly folded. If the thickness is under 20 μm, the strength is not enough. These bags are manufactured by various resin forming methods, especially a blow moulding method in which a plastic preform is heated to be softened in a heated mol %, and compressed air is then supplied into the plastic preform to expand it, so that the expanded body contacts the inner wall of the cavity of the mol %. The expanded hollow body as a bag body in separated from the mol %. A preform is usually manufactured by an injection molding. However, the preform may be manufactured by extrusion molding in which heated and melted plastic material is extruded out. A simple frame for adjusting the shape of the bag may be used without using a conventional mold. Moreover, a drawing blow moulding without the mold and the frame can be adopted.

In FIG. 3, the mouthpiece 12 connected to the bag body 17 of the bag 8 may be made of the same material as that of the bag body 17, and may be formed as an assembled body in which metal is combined with the resin.

In case that the bag body 17 is manufactured through the blow forming of the preform which is formed by an injection molding, a volume expansion rate of the bag body 17 with respect to the volume of the preform is within 100–240, preferably 120–200. The volume expansion rate is defined as follows.

$$\text{Volume expansion rate} = \frac{\text{Inner volume of bag body}}{\text{Inner volume of preform}}$$

The bag body for a bag-in-box formed in this manner gradually shrinks as the contents filled in the bag are gradually taken out, and the shrinking direction of the bag is not specially restricted.

This invention will now be explained in more detail with reference to examples.

EXAMPLE 1

(1) Manufacture of sample 1 according to this invention

A preform was produced in such a manner that polyethylene terephthalate resin [J125 manufactured by MITSUI PET RESIN CO. (limiting viscosity [η] is 0.71 dl/g)) was heated to a temperature of 270°–290° C. to be injected. The preform was heated by an infra-red heater to 100 C., and was then extended or expanded freely in a simple mold 80 that the thickness of the main body of a bag was 100 gm and the volume expansion rate was 159. The bag (sample 1 according to this invention) was thus manufactured.

(2) Preparation of compared samples 1 to 3

A laminated bag mainly made of polyethylene available at present was prepared. The concrete laminated layer structures were as follows.

Compared sample 1: PE (40 μm)/EVAL (10 μm)/PE (40 μm)+PE (40 μm)/EVAL (10 μm)/PE (40 μm)

Compared sample 2: PE (50 μm)/ONY (20 μm)/PE (50 μm)+ONY (20 μm)/PE (50 μm)

Figure 4:
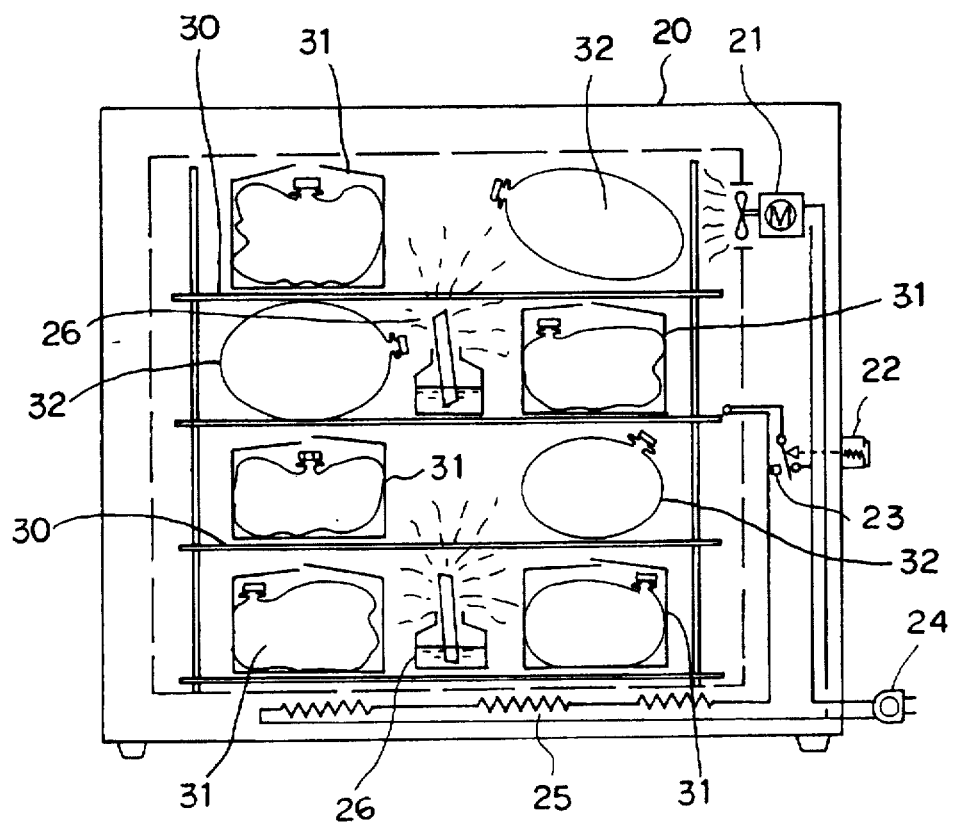
FIG. 4 is an inner structural view of a temperature controlled box for preservation.

Compared sample 3: EVA (80 μm)+PE (30 μm)/KONY (20 μm)/PE (50 μm)

wherein PET is polyethylene telephtalate, PE is polyethylene, EVAL is ethylene-vinylalcohol copolymer, ONY is oriented nylon, KONY is oriented nylon coated with vinylidene chloride, EVA is ethylene-vinylacetate copolymer and OPP is oriented polypropylene. The following preservation test for mineral water was performed with reference to the sample 1 of this invention and the three compared samples 1 to 3. First, mineral water was filled into each bag while a heat-sterilization is performed. These bags with mineral water therein were put into a temperature controlled box 20 of 30° C. to be preserved therein at a relative humidity of 75% for eight weeks as shown in FIG. 4. The temperature controlled box 20 has therein a plurality of shelves 30, 30—30 on which there are some compared samples 31, 31—31, some invented samples 32, 32—32 and some small generators 26 and 26 to stick the smell on each bag. At the bottom of the box 20 is provided an electric heater 25 which is controlled by a temperature sensor 23 and a temperature control unit 22. An air circulating fun 21 is provided at an upper portion of the box 20 to circulate the air in an accommodated space of the box 20, and the air circulating fun, 21, the electric heater 21, the temperature control unit 22 and the temperature sensor 23 are connected to a plug 24. The smell generator 26 included small components such as i) citrus series d-limonene as base, lemon terpene, and orange $C_6$ aldehyde, ii) coffee series flavone, and iii) lactic series $C_{10}$ lactone, and diacetyl. Each smell component was diluted by ethanol to be mixed with each other at a mixing rate of i):ii): iii)=5:2:1. Then, ten persons tried to smell each sample in bag. Each person judged the order (ranking) of -smell on each sample in bag. The result is shown in Table 1 in which each position means the level of smell, and, for example, the first position means that the level of smell is lowest, in comparison with other bags and the fourth position means that the level of smell is highest in comparison with other bags.

TABLE 1

|  | Heat filling immediately after | One week after | Two weeks after | Four weeks after | Eight weeks after |
|---|---|---|---|---|---|
| Invented sample 1 | First position** (10/10) | First position** (10/10) | First position** (10/10) | First position** (10/10) | First position** (10/10) |
| Compared sample 1 | Second position* (8/10) | Second position (5/10) | Second position (6/10) | Second position (5/10) | Second position (6/10) |
| Compared sample 2 | Third position (5/10) | Third position (4/10) | Third position (3/10) | Third position (5/10) | Third position (4/10) |
| Compared sample 3 | Fourth position (6/10) | Fourth position (5/10) | Fourth position** (8/10) | Fourth position (5/10) | Fourth position (6/10) |

*; The level of significance is 5%.
**; The level of significance is 10%.

The number in the parenthesis means the number of the panel who ranked each position/total panel number.

Judging from Table 1, the invented sample 1 made of PET according to this invention keeps the first position during eight weeks. that is. the sample 1 could effectively prevent a smell from passing through the bag. so that the smell was not stuck to the contents in the bag.

EXAMPLE 2

Preservation test was performed with reference to the invented sample 1 in Example 1 and the compared sample 1 in Example 1. Each sample was heat-filled with citrus series syrup. The compared sample 1 was selected because it was the best one among conventional bags as a result of the above 1. preservation test in Ezample 1. The preservation condition was the same as in Example 1. The triangle test was conducted by ten persons to distinguish invented sample 1 and compared sample 1. The result is shown in Table 2.

TABLE 2

|  | One week after | Two weeks after | Eight weeks after |
|---|---|---|---|
| Distinction between invented sample 1 and compared sample 1 | 5 persons were correct | 8 persons were correct * | 10 persons were correct ** |
| Person who felt invented sample 1 was better than compared sample 1 | 5 persons | 8 persons | 10 persons |

*; The level of significance is 5%.
**; The level of significance is 10%.

Judging from Table 2. it was difficult to judge which sample was better in comparison with Example 1 because the contents filled in each sample have theirselves perfume. However, the difference in quality of packaging material between two samples becames distinctive as time had passed. and it was judged that the invented sample 1 was remarkably superior to the compared sample 1. In the upper block of Table 2. the sentence "5 persons were correct" means that five persons among ten persons could distinguish the invented sample 1 from the compared sample 1 after they smelled each sample. In the lower block of Table 2. the working "5 person" means that five persons among ten persons felt that the level of smell on the invented sample 1 was better that of the compared sample 1.

EXAMPLE 3

Preservation test was performed with reference to each sample mentioned below into which vodka or rum was filled. If vodka or rum at a high density of alcohol is filled into a bag-in-box to be preserved, evil smell is more or less attached to the contents of solution in a bag made of synthetic resin. Therefore. it is necessary to select a bag which evil smell is little attached to the contents or no evil smell Is attached thereto in order not to deteriorate the quality of contents to maintain the taste of the contents. The vodka and rum used; for the experiments are shown in Table 3.

TABLE 3

| Brand | Density of alcohol (°GL) | Volume (l) | Container |
|---|---|---|---|
| Kirin-seagram vodka | 50 | 18 | 20 l back-in-box |
| Myersconfectionery rum | 40 & 55 | 20 | 20 l back-in-box |

Bags for accommodating the vodka and rum are shown in Table 4.

TABLE 4

| Maker | Sample | Volume (l) | Structure of film and thickness |
|---|---|---|---|
| Kirin Beer | Invented sample 1 | 20 | PET (100µ) |
| F company | Compared sample A | 20 | Single layer PE (0.12–0.3 mm) |
| T company | Compared sample B | 20 | PE (75µ) + PE (35µ)/K-NY (15µ)/PE (55µ)→Side of contacting contents |
| D company | Compared sample C | 20 | OPP (20µ)/KON (15µ)/PE (40µ) + PE (40µ)→Side of contacting contents |
|  | Compared sample D | 20 | OPP (20µ)/KON (15µ)/PE (40µ) + EVA/PE (90µ)→Side of contacting contents |

Nicolay Vodka of 50° GL and Myeraconfectunary Rum of 55° GL were filled into each sample. The quantity of contents was 300 ml. The each sample was then left in atmosphere for 1. 2 and 3 months and. thereafter. each content was diluted to 20° GL with pure water. Further, appearance and smell of each sample was observed and detected. These results are shown in Table 5 and Table 6.

TABLE 5

| Sample | Appearance |
|---|---|
| Invented sample 1 | Colorless, transparent |
| Compared sample A | Colorless, transparent |
| Compared sample B | Colorless, transparent |
| Compared sample C | Colorless, transparent |
| Compared sample D | Cloudy |

TABLE 6

Level of evil smell

| | Nicolay vodka | | | Mayersconfectionery rum | | | |
|---|---|---|---|---|---|---|---|
| Sample | One month after | Two months after | Three months after | One month after | Two months after | Three months after | Kind of evil smell |
| Invented sample 1 | – | – | – | – | – | – | None |

TABLE 6-continued

| | Level of evil smell | | | | | | |
|---|---|---|---|---|---|---|---|
| | Nicolay vodka | | | Mayersconfectionery rum | | | |
| Sample | One month after | Two months after | Three months after | One month after | Two months after | Three months after | Kind of evil smell |
| Compared sample A | +++ | ++++ | +++++ | ++ | +++ | ++++ | Smell of plastic |
| Compared sample B | + | ++ | +++ | ± | + | ++ | Sweet smell of plastic |
| Compared sample C | + | + | ++ | ± | ±-+ | + | Smell of plastic |
| Compared sample D | ++++ | +++++ | +++++ | ++ | +++ | ++++ | Sweet smell of plastic |

*Level of evil smell
− . . . no feel, ± . . . slightly feel, + . . . cleary feel, ++ . . . moderate–strongly feel, +++ . . . strongly feel, ++++ . . . very strongly feel, +++++ . . . extreme–strongy feel According to the result of Tables 5 and 6, the compared sample D is not suitable for a container for the above drinks because the compared sample D becomes whitely cloudy when it is diluted to 20° GL with pure water. Further, in four kinds of bag-in-boxes except the compared sample D, the table 6 shows the order in which the level of sticking of evil smell becomes below.

Invented sample 1 <Compared sample C <Compared sample B <<Compared sample A

In conclusion, the invented sample 1 made of PET is suitable for a bag-in-box for vodka and rum at a high density of alcohol.

EXAMPLE 4

Further, preservation test for beer was performed in the following manner.

The invented sample 1 (20l) made of PET and a compared sample S (20l) made of stainless steel (tank) were prepared to be filled with draft beer including $CO_2$ of 0.5%. These samples were preserved at a temperature of 20° C. for various periods to observe the contents therein periodically. This time, the triangle test was conducted by thirteen persons to distinguish invented sample 1 and compared sample S. The result is shown in Table 7.

TABLE 7

| | One week after | Two weeks after | Four weeks after | Eight weeks after |
|---|---|---|---|---|
| Distinction between invented sample 1 and compared sample S | 4 persons among 13 were correct | 5 persons among 13 were correct | 4 persons among 13 were correct | 8 persons among 13 were correct |
| Person who felt that compared sample S was better than invented sample 1 | 2 persons | 3 persons | 2 persons | 8 persons |

*; The level of significance is 5%.

Judging from the Table 7, there was no difference in quality of beer during four weeks between the two samples 1 and S. Beer in the invented sample 1 was slightly deteriorated eight weeks after. However, draft beer in a large container (above 7l) is normally consumed within four hours after filling. Therefore, the invented sample 1 can be practically used for draft beer.

A bag for a bag-in-box according to this invention has a strength larger than a conventional one. Its gas barrier property is also much better than that of a conventional one. An ability of deodorization and keeping perfume was much improved. Smell component hardly attaches to the bag and small component of the Contents in the bag hardly disperses outward through the wall of the bag. A conventional bag-in-box was a laminated container mainly made of polyethylene with a plurality of layers. However, since the bag according to this invention is made of a single layer of polyethylene telephtalate resin, it is suitable for recyle treatment in comparison with the conventional bag-in-box. In these advantageous effects of the bag according to this invention, since smell component of the bag does not attach to the contents therein, the bag according to this invention can be adapted for food and drinks which are apt to be deteriorated by attachment of smell component except contents. For example, this bag-in-box can be used for mineral water, fruit syrup, flavor undiluted solution, rum and vodka for material of cakes and soups. Further, since this bag-in-box has a good pressure resistance and gas barrier property, it can be adapted for drinks including carbon dioxide such as beverage and beer. Further, since this bag-in-box is rather inexpensive, it is suitable for a disposable bag for drinks.

What is claimed is:

1. A bag-in-box combination wherein the bag is made of film material so as to be collapsible to push out contents therein such as beverage syrups and liquid foods, wherein the bag collapsible bag body is a collapsible bag body made of polyester resin from an injection molded preform through a blow-formation process so as to provide a thickness of 20–150 μm, and a mouthpiece provided on the bag body for passing the contents therethrough, said bag body having a volume expansion rate of 100–240 in the blow-formation process, and wherein the box is made of cardboard.

2. The bag-in-box combination according to claim 1, wherein said mouthpiece is made of polyester resin.

3. The bag-in-box combination according to claim 1, wherein said mouthpiece is formed as an assembled body in which metal in combined with polyester resin.

4. The bag-in-box combination according to claim 1, wherein said bag body is made of a single layer of polyester resin.

5. The bag-in-box combination according to claim 1, wherein the polyester resin includes thermal stabilizer, weather resistant stabilizer, antistatic agent, lubricant, releasing agent, inorganic filler, pigment, pigment dispersing agent or die.

6. The bag-in-box combination according to claim 1, wherein said polyester resin comprises polyethylene terephthalate resin, polyethylene naphthalate resin, or copolymerized polyester resin.

7. The bag-in-box combination bag according to claim 6, wherein said polyethylene telephtalate rosin includes: terephthalic acid or ester-forming derivative of the terephthalic acid; and ethylene glycol or enter forming derivative of the ethylene glycol.

8. The bag-in-box combination according to claim 6, wherein said polyethylene naphthalate resin includes: ethylene-2,6 naphthalene component unit derived from 2,6-naphthalene dicarboxylic acid and ethylene glycol.

9. The bag-in-box combination according to claim 6, wherein said copolymerized polyester resin comprises:

dicarboxylic acid structural unit including terephthalic acid component unit and isophtalic acid component unit; and dihydroxy compound structural unit including ethylene glycol component unit.

10. The bag-in-box combination according to claim 6, wherein said copolymarized polyester resin comprises: dicarboxylic acid structural unit including terephthalic acid component unit and 2,6-naphtalene dicarboxylic acid component unit; and dihydroxy compound structural unit including ethylene glycol component unit.

11. The bag-in-box combination according to claim 6, wherein said copolymerized polyester resin comprises; dicarboxylic acid structural unit including terephthalic acid component unit and adipic acid component unit; a dihydroxy compound structural unit including ethylene glycol component unit.

12. The bag-in-box combination according to claim 6, wherein said copolymerized polyester resin comprises: dicarbozylic acid structural unit including terephthalic acid component unit; and dihydroxy compound structural unit including ethylene glycol component unit and diethylene glycol component unit.

13. The bag-in-box combination according to claim 6, wherein said copolymerized polyester resin comprises: dicarboxylic acid structural unit including terephthalic acid component unit and isophtalic acid component unit; and dihydoxy compound structural unit including ethylene glycol component unit and neopentyl glycol component unit.

14. The bag-in-box combination according to claim 6, wherein said copolymerized polyester resin comprises: dicarboxylic acid structural unit including terephthalic acid component unit; and dihydroxy compound structural unit including ethylene glycol component unit and cyclohexonedimethanol unit.

15. The bag-in-box combination according to claim 6, wherein said copolymerized polyester resin comprises: dicarboxylic acid structural unit, dihydroxy compound structural unit and multifunctional hydroxy compound structural unit including at least three hydroxy groups.

16. The bag-in-box combination according to claim 1, wherein the thickness of the bag body is 50–126 μm.

17. A bag-in-box combination wherein the bag is made of film material so as to be collapsible to push out contents therein such as beverage syrups and liquid foods, wherein the bag is a collapsible bag body collapsible bag body made of an intermediate layer of polyamide resin between laminated layers of polyester resin from an injection molded preform through a blow-formation process so as to provide a thickness of 20–150 μm, and a mouthpiece provided on the bag body for passing the contents therethrough, said bag body having a volume expansion rate of 100–240 in the blow-formation process, and wherein the box is made of cardboard.

* * * * *